United States Patent [19]
Wiczynski et al.

[11] Patent Number: 5,685,267
[45] Date of Patent: Nov. 11, 1997

[54] SPHERICAL JOINT CONNECTING ROD

[75] Inventors: Paul David Wiczynski; Craig Allen Barnes; Richard Belush, all of Columbus; Richard Duane Conrow, Churubusco, all of Ind.; Siegfried Gustav Mielke, Neckarsulm, Germany

[73] Assignee: Cummins Engine Company, Inc., Columbus, Ind.

[21] Appl. No.: 597,816

[22] Filed: Feb. 7, 1996

[51] Int. Cl.⁶ ................................................ F02B 75/26
[52] U.S. Cl. .................. 123/197.3; 74/587; 74/579 E
[58] Field of Search .................... 123/197.3, 197.4; 74/579 R, 587, 579 E

[56] References Cited

U.S. PATENT DOCUMENTS

| | | |
|---|---|---|
| 3,361,007 | 1/1968 | Belsanti et al. ................ 74/587 |
| 3,739,657 | 6/1973 | Patchen et al. ................ 74/579 E |
| 4,372,179 | 2/1983 | Dolenc et al. . | 
| 4,905,577 | 3/1990 | Schneeweiss . |
| 4,938,121 | 7/1990 | Melchior . |
| 5,094,195 | 3/1992 | Gonzalez ................ 123/197.3 |
| 5,115,725 | 5/1992 | Horiuchi . |
| 5,146,883 | 9/1992 | Reipert et al. . |
| 5,261,797 | 11/1993 | Christenson . |
| 5,305,684 | 4/1994 | Melchior . |
| 5,313,875 | 5/1994 | Kadlicko . |

FOREIGN PATENT DOCUMENTS

0012073  2/1981  Japan ........................ 74/587

*Primary Examiner*—Marguerite McMahon
*Attorney, Agent, or Firm*—Woodard, Emhardt, Naughton, Moriarty & McNett

[57] ABSTRACT

A spherical joint connecting rod. The connecting rod has a small end which terminates in a sphere or ball, and a big end which is adapted to sliding engage an engine crankshaft. The small end and big end of the connecting rod are coupled by a shank having a substantially elliptical cross-section. The shank has formed therethrough an internal oil passage which allows transmission of lubricating/cooling oil from the engine crankshaft to the spherical joint of the piston and to the piston cooling gallery.

22 Claims, 10 Drawing Sheets

SPHERICAL JOINT CONNECTING ROD

TECHNICAL FIELD OF THE INVENTION

The present invention relates generally to piston machines or engines. The invention relates particularly to a piston machine which has at least one cylinder and a piston axially moveably guided in the cylinder. The invention more particularly relates to those pistons which have, within an externally cylindrical skirt, a partially spherical bearing surface for receiving in the manner of a ball joint the partly spherical head of a connecting rod. For reasons which will be explained hereinafter, the bearing surface of the piston and/or the head of the rod may have by construction a shape which is partly not strictly spherical but, for simplifying the description, the expression "spherical" will be used in this context for designating a shape which is exactly or approximately spherical.

BACKGROUND OF THE INVENTION

In known piston machines which operate in a similar manner as internal combustion engines, the force of the piston is transmitted to a piston pin onto the connecting rod and then to the crankshaft connected to the connecting rod. Since the connecting rod is pivotable only in one plane transversely of the axis of the piston pin, the eye of the connecting rod (i.e. the bore in the connecting rod in which the piston pin of the piston is mounted) must be arranged exactly parallel to the axis of the crankshaft in order to avoid deviations in the parallelism and, thus, canting or tilting of the piston within the cylinder. This exact arrangement is technically very difficult to obtain. Even slight deviations in the parallelism between the axis of the crankshaft and the axis of the connecting rod causes canting of the piston which leads to premature wear and failure of the machine.

In order to avoid these disadvantages, piston machines have been developed in which the connection between the connecting rod and piston permits relative movement between the piston and the connecting rod in more than one axial direction, so that any deviations and parallelism can be compensated. In such machines, the piston force is transmitted onto the connecting rod by means of a spherical joint. The spherical joint is formed by a ball at the end of the connecting rod shaft which is supported in a corresponding spherical socket in the piston. By using a spherical joint between the piston and the connecting rod, the abovementioned deviations and parallelism are avoided, so that the overall manufacturing tolerances are not as constrained. Thus, manufacturing the machine becomes simpler and less expensive.

Because significant forces are transmitted from the piston to the spherical end of the connecting rod, and because there is constant motion between the spherical socket of the piston and the spherical end of the connecting rod, it is necessary to supply a suitable quantity of lubricating oil to this joint in order to prevent premature wear of the joint and overheating thereof. Additionally, it is desirable to provide a supply of oil to a cooling gallery within the piston in order to sink a portion of the heat transmitted to the piston by the combustion process. Because of the importance of these functions, it is extremely important that a continuous supply of oil be supplied to the area of the spherical joint, such oil supply being unimpeded by the position of the connecting rod within the piston. The present invention is directed toward meeting this need.

SUMMARY OF THE INVENTION

The present invention relates to a spherical joint connecting rod. The connecting rod has a small end which terminates in a sphere or ball, and a big end which is adapted to sliding engage an engine crankshaft. The small end and big end of the connecting rod are coupled by a shank having a substantially elliptical cross-section. The shank has formed therethrough an internal oil passage which allows transmission of lubricating/cooling oil from the engine crankshaft to the spherical joint of the piston and to the piston cooling gallery.

In one form of the invention a spherical joint connecting rod is disclosed comprising a big end adapted to slidingly engage an engine crankshaft; a semi-spherical small end adapted to be received within a spherically jointed piston; and a shank coupling the big end to the small end, the shank having a substantially elliptical cross-section at at least one point along its length.

In another form of the invention a spherical joint connecting rod is disclosed comprising a big end adapted to slidingly engage an engine crankshaft; a semi-spherical small end adapted to be received within a spherically jointed piston; a shank coupling the big end to the small end; and at least one notch formed in a surface of the small end; wherein the notch is configured to receive a spray of lubricant and deflect the lubricant to a region surrounding the small end.

DETAILED DESCRIPTION OF THE PREFERRED EMBODIMENTS

For the purposes of promoting an understanding of tile principles of the invention, reference will now be made to the embodiment illustrated in the drawings and specific language will be used to describe the same. It will nevertheless be understood that no limitation of the scope of the invention is thereby intended, such alterations and further modifications in tile illustrated device, and such further applications of the principles of the invention as illustrated therein being contemplated as would normally occur to one skilled in the art to which the invention relates.

Figure 1:
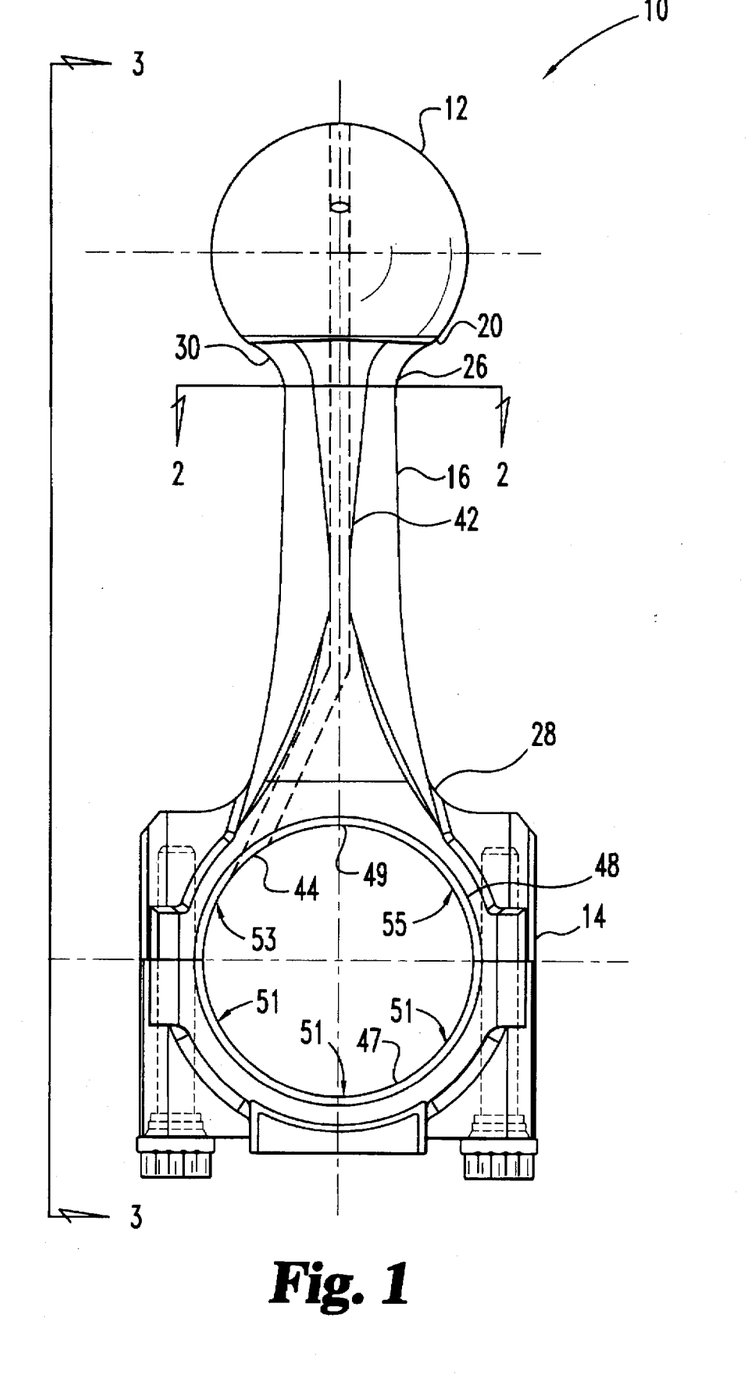
FIG. 1 is a first side-elevational view of a first embodiment of the spherical joint connecting rod of the present invention.

Referring to FIG. 1, a first embodiment of the spherical joint connecting rod of the present invention is illustrated and indicated generally at 10. The spherical joint connecting rod 10 comprises a substantially spherical small end 12 coupled to a conventional rod big end 14 by means of a shank 16. The connecting rod big end 14 is fitted around a crankshaft of an engine (not shown), while the connecting rod small end 12 is seated within a spherically jointed piston of the engine (see FIG. 8). In the process of coupling the piston, which is moving in a vertical direction within the cylinder, to the engine crankshaft, which is moving in a circular direction about an axis perpendicular to the axis of the cylinder, the spherical small end 12 of the connecting rod 10 will pivot within its seat in the piston without the need for a bearing material between the piston and the connecting rod. The connecting rod small end 12 is retained within the piston socket by two holder ring halves described hereinbelow. The connecting rod small end 12 bears against the piston saddle and the lower bearing surface of the holder ring halves.

Figure 2:
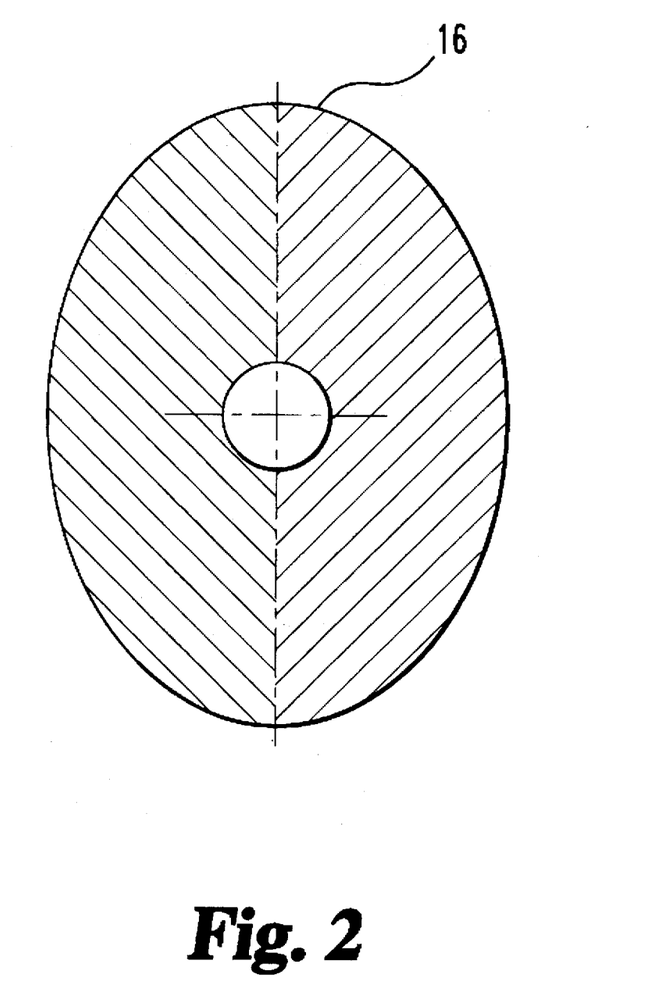
FIG. 2 is a cross-sectional view of the shank of the spherical joint connecting rod of FIG. 1.
Figure 3:
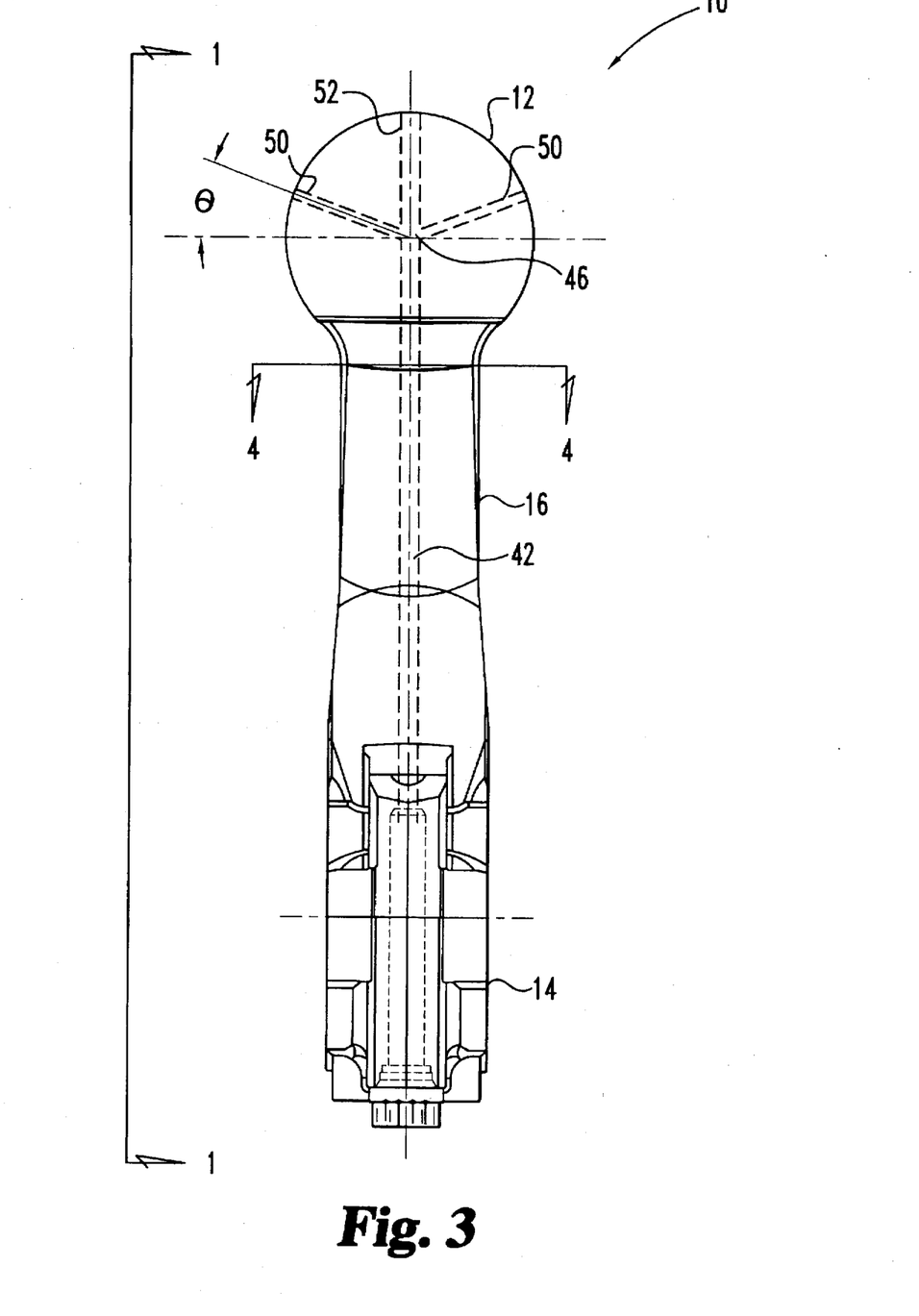
FIG. 3 is a second side elevational view of the first embodiment spherical joint connecting rod of the present invention.
Figure 4:
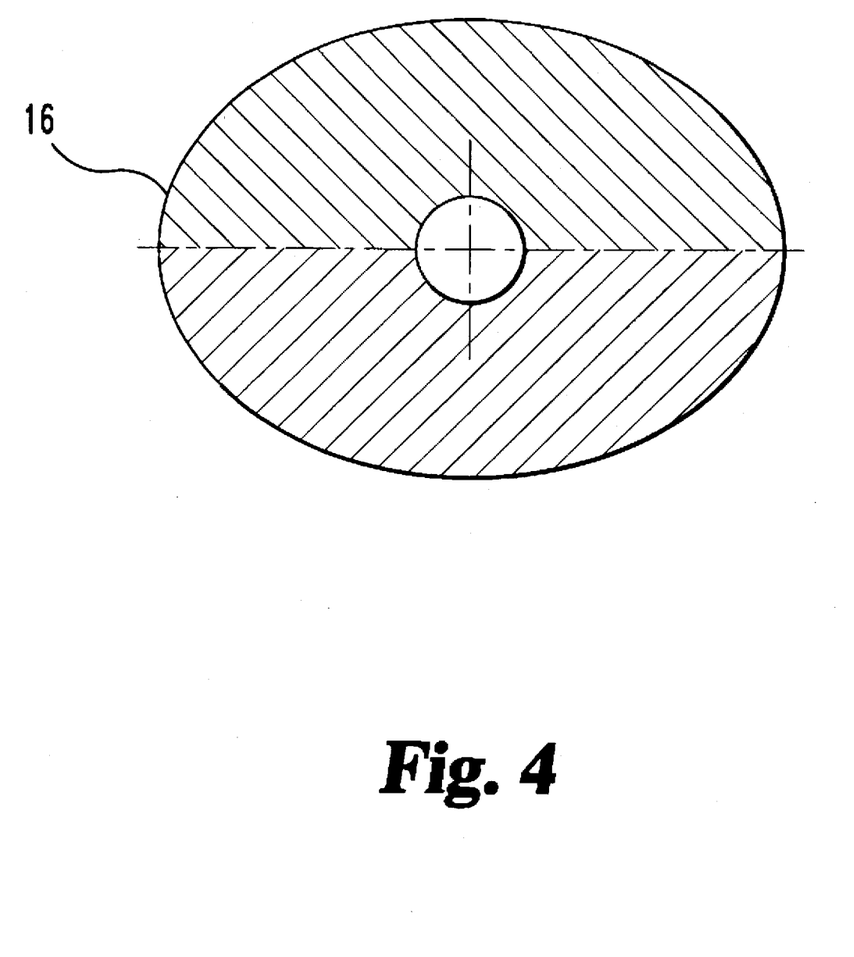
FIG. 4 is a cross-sectional view of the shank of the connecting rod of FIG. 3.
Figure 5:
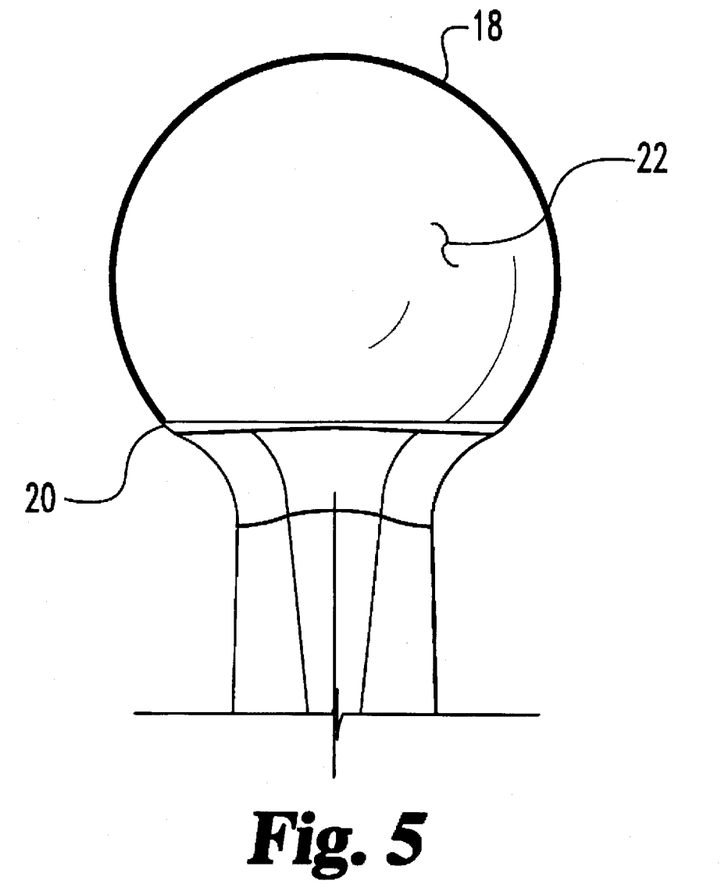
FIG. 5 is a third side elevational view of the first embodiment spherical joint connecting rod of the present invention.

The connecting rod 10 is preferably made from E4340 PH steel. The small end sphere surface 18 (see FIG. 5) is preferably spin induction hardened to a case depth of 1.27 mm. The hardened case encompasses the entire sphere 12, but does not encroach upon the radius 20 at the base of the sphere so as to avoid stress risers. The surface 22 (see FIG. 5) is preferably ground to a finish of 0.08 micrometers maximum. The connecting rod small end sphere 12 sits atop the shank 16, which preferably has a substantially elliptical cross-section as illustrated in FIG. 2. As used herein, the term "substantially elliptical" is intended to refer to any generally oval or elliptical shape, whether or not the shape is a true ellipse. The elliptical cross-section of the shank 16 is preferred because it allows for connecting rod clearance at the lower opening 24 of the holder rings (see FIG. 8), while providing sufficient cross-sectional area to maintain suitable stresses at the shank 16/sphere 12 transition 26. Alternatively, the shank 16 cross-section may be made circular. The shank 16 cross-section initiates as a square form at its connection 28 with the connecting rod big end 14. The cross-section of the shank 16 smoothly transitions from its square form at the connection 28 to the elliptical form of the main section of the shank 16. The cross-section of the shank 16 then transitions from the elliptical form to tile circular form of the small end sphere 12 by means of suitable radii 30 at the base of the sphere 12. The spherical joint connecting rod 10 is additionally illustrated in an orthogonal view in FIG. 3. A cross-section of the shank 16 taken from the view of FIG. 3 is illustrated in FIG. 4.

Figure 8:
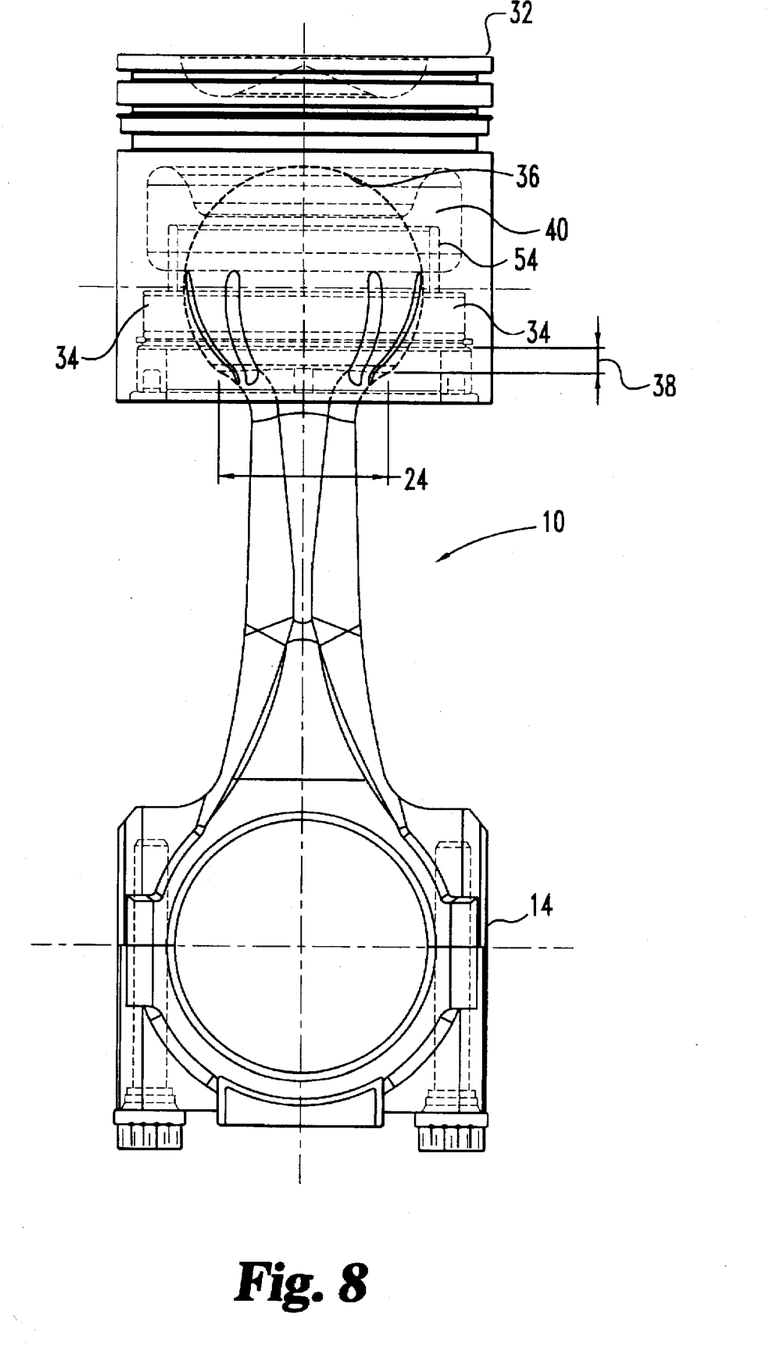
FIG. 8 is a side elevational view of the second embodiment spherical joint connecting rod of the present invention engaged with a spherical jointed piston.
Figure 9:
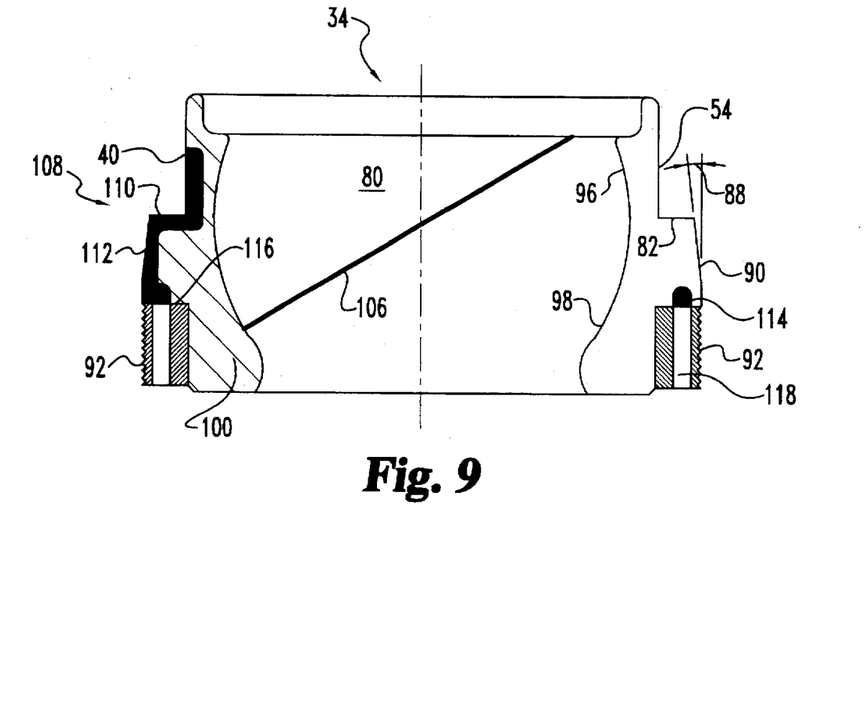
FIG. 9 is a side elevational view of a first embodiment holder ring half of the present invention.

Referring to FIG. 8, the connecting rod 10 is coupled to a spherical jointed piston 32 by means of the small end sphere 12. The connecting rod small end sphere 12 is retained within the piston 32 socket by two holder ring halves 34. The connecting rod small end sphere 12 bears against the pistol, saddle 36 and the lower bearing surface 98 of the holder ting halves. As the connecting rod big end 14 executes a circular motion, the spherical jointed piston 32 reciprocates in a vertical direction while the spherical small end 12 of the connecting rod 10 pivots between the piston saddle 36 and the lower bearing surface 98 of the holder ring halves 34.

The contact surfaces between the spherical small end 12 and the spherical jointed piston 32 are lubricated by engine oil. Furthermore, engine oil is provided to tile piston cooling gallery 40 in order to dissipate heat in the piston 32 caused by friction and by the heat of combustion above the piston 32. Referring once again to FIGS. 1, 3 and 8, lubricating/cooling oil is supplied from the engine crankshaft to the piston saddle 36 and piston cooling gallery 40 through an oil passage 42 formed in the connecting rod 10. The oil passage 42 originates at an opening 44 in the rod big end and extends to the center 46 of the small end sphere 12. The oil passage 42 receives oil from a slotted connecting rod bearing 48 situated in the connecting rod big end 14 bore. The oil passage 42 branches into 2 or more lateral passages 50 and one central passage 52 at the center of the sphere 46. The central passage 52 supplies oil to the piston saddle 36. The lateral passages 50 supply oil to the piston cooling gallery 40. The lateral passages 50 are situated at an angle $\theta$ with respect to a transverse cross-section of the sphere 12 so that the exiting oil flow is unimpeded by the holder ring oil dam 54 throughout the entire range of connecting rod rocking motion.

The slotted connecting rod bearing 48 is provided to facilitate transfer of oil from the engine crankshaft to the oil passage 42. Lubricating and cooling oil is pressure fed to the connecting rod bearing 48 through a drilling in the crankshaft crank throw (the crank throw is that part of the crankshaft to which the connecting rod 10 is attached). The oil is pressure fed to the crankshaft through the main bearings. Tile connecting rod bearing hole 44 allows oil to pass through to the oil passage 42. The most effective transfer of oil occurs when the crank throw drilling is in alignment with the connecting rod bearing hole 44. However, the amount of time when the crank throw drilling and tile hole 44 are in alignment is very short. This situation is not conducive for the continuous flow of oil required for the present spherical joint piston design.

In order to improve the transfer of oil from the crank throw to the connecting rod, a slot is center cut into the face of the bearing surface of the connecting rod bearing 48. The connecting rod bearing 48 consists of two halves: a lower half 47 and an upper half 49. The slot (not shown) is cut along the full center length 51 of the lower bearing half 47. The slot continues on the upper bearing half 49 only on the short side 53 of the upper bearing half 49 and terminates at the hole 44. The hole 44 is preferably positioned approximately 30° from the horizontal. Thus there is a short side 53 and a long side 55 to the upper bearing half 49. The long side 55 takes the connecting rod load. Therefore with no hole or slot on the long side 55, the load bearing area is maximized and stresses are minimized. The slot provides a path for oil flow to the hole 44 in the bearing 48 when the crank throw drilling and bearing hole 44 are not in alignment. In fact, the slot allows oil flow for approximately 210° of crankshaft rotation. Although the oil flow to the connecting rod oil path 42 remains intermittant, the duration of oil flow is significantly increased. Therefore oil flow to the spherical joint piston is increased.

Figure 6:
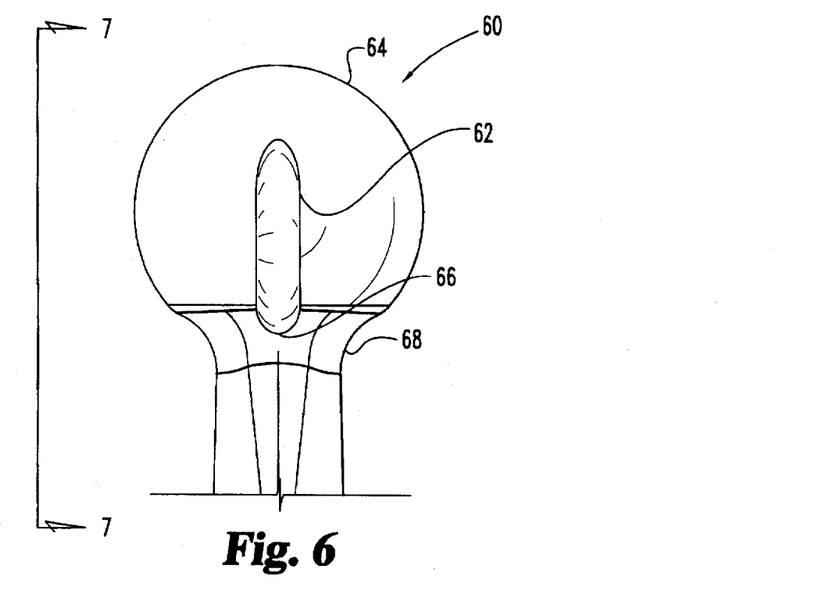
FIG. 6 is a first side elevational view of a second embodiment spherical joint connecting rod of the present invention.
Figure 7:
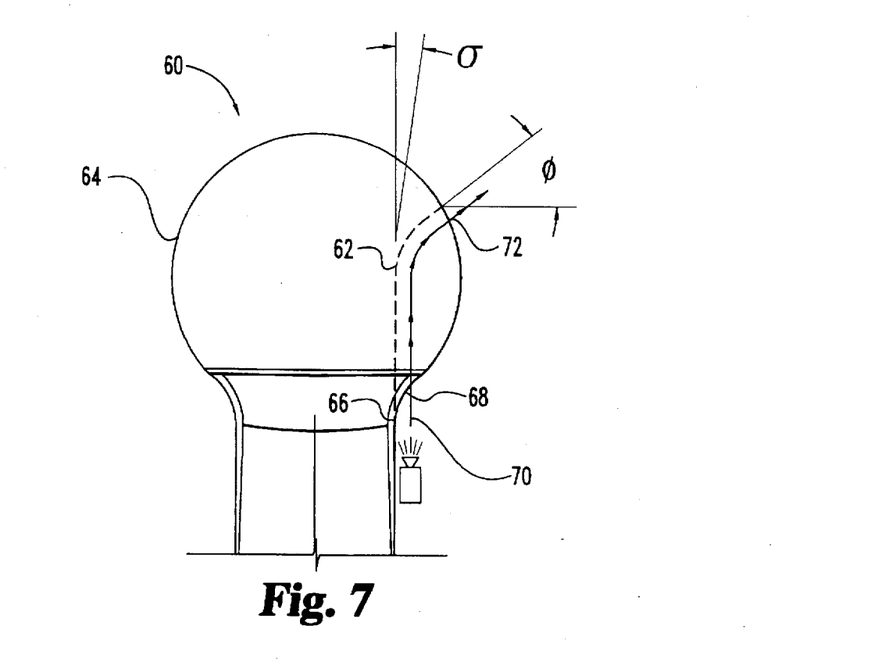
FIG. 7 is a second side elevational view of the second embodiment spherical joint connecting rod of FIG. 6.

Referring now to FIGS. 6 and 7, a second embodiment connecting rod of the present invention is illustrated and indicated generally at 60. The connecting rod 60 generally has the same configuration as the connecting rod 10 with the exception that the central oil passages are eliminated and instead lubricating/cooling oil is introduced into the piston cooling gallery 40 through at least one notch 62 formed into the side of the small end sphere 12. The lower end 66 of the notch 62 is situated near the shank/sphere transition 68 at an angle $\phi$ with respect to a longitudinal cross-section of the sphere 12 so that a targeted piston cooling nozzle oil spray 70 can enter the lower end 66 of the notch 62 throughout the entire range of connecting rod 60 rocking motion. The piston cooling nozzle is not illustrated in FIGS. 6 and 7 and is of the type generally known in the art. The interior of the notch 62 is formed so that the oil spray 70 is deflected from within the notch 62 into the piston cooling gallery 40 at an angle $\phi$ so that the exiting oil flow 72 is unimpeded by the holder ring oil dam 54 throughout the entire range of connecting rod 60 rocking motion.

Referring now to FIGS. 9–13, the holder ring halves 34 of the present invention which are operative to retain the spherical small end of the connecting rod 10 or 60 within the spherically jointed piston 32 are described in greater detail. The holder ring is comprised of two halves 34 which fit together within the spherically jointed piston 32 in order to retain the spherical end of the connecting rod therein. The spherical small end 12, 64 of the connecting rod 10, 60 is retained within the socket 80 of the holder rings 34. The connecting rod and holder rings 34 fit into the piston 32 so that the upper ring shoulder 82 rests against a shoulder 84 within the piston skirt 86 of the spherically jointed piston 32. A chamfer 88 on the perimeter of the holder rings 34 eases the installation of the holder rings 34 into the piston skirt 86. A light press fit area 90 positions the holder rings 34 within the piston skirt 86. The holder rings 34 are then firmly pressed and held in place within the spherically jointed piston 32 by means of a threaded collar 92 which threadingly engages a threaded surface on the interior of the piston skirt 86.

Figure 10:
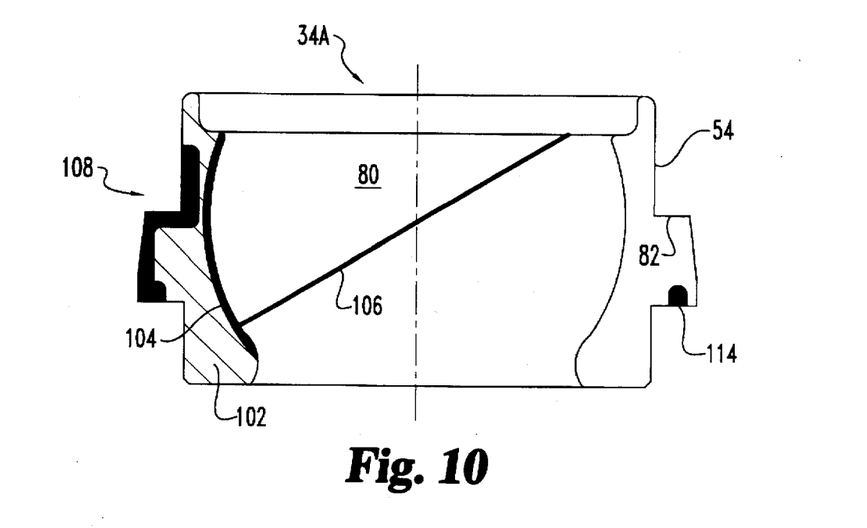
FIG. 10 is a side elevational view of a second embodiment holder ring half of the present invention.

The upper ring perimeter 54 forms the inside wall of the piston cooling gallery 40 and therefore acts as an oil dam. The extension 96 of the socket surface 80 above the level of the upper ring shoulder 82 guides the connecting rod spherical small end 12, 62 while the spherical small end moves between the piston saddle 36 and the socket 80 lower bearing surface 98. The holder rings 34 may preferably be made from an aluminum bronze alloy 100. Alternatively, a different version of the holder ring, indicated at 34A is shown in FIG. 10. The holder ring 34A is made from a gray cast iron 102 with an aluminum bronze coating 104 applied to the interior surface of the socket 80. The aluminum bronze surface 104 provides a favorable bearing surface for the connecting rod spherical small end as compared to the gray cast iron 102.

Figure 11:
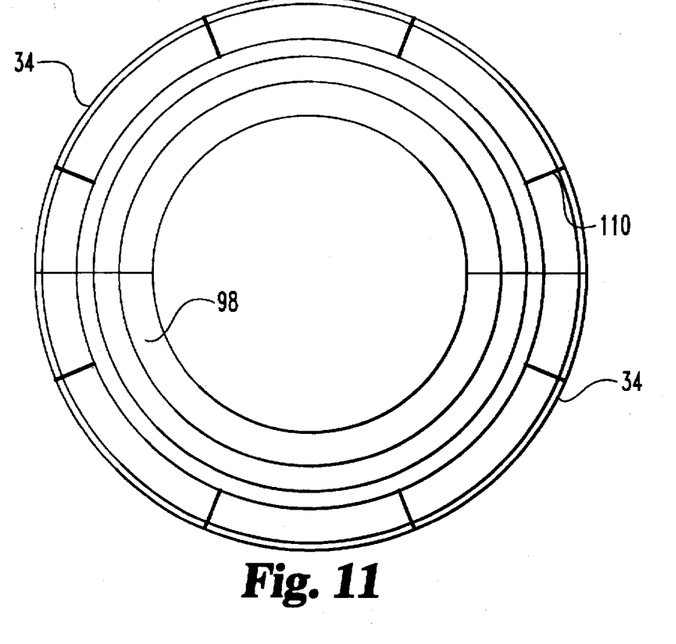
FIG. 11 is a top plan view of the holder ring half of the present invention.
Figure 12:
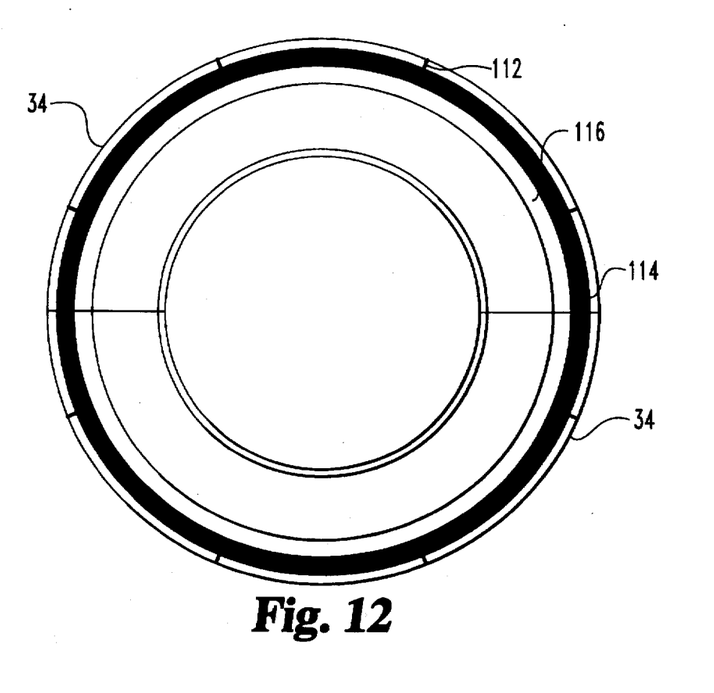
FIG. 12 is a bottom plan view of the holder ring half of the present invention.
Figure 13:
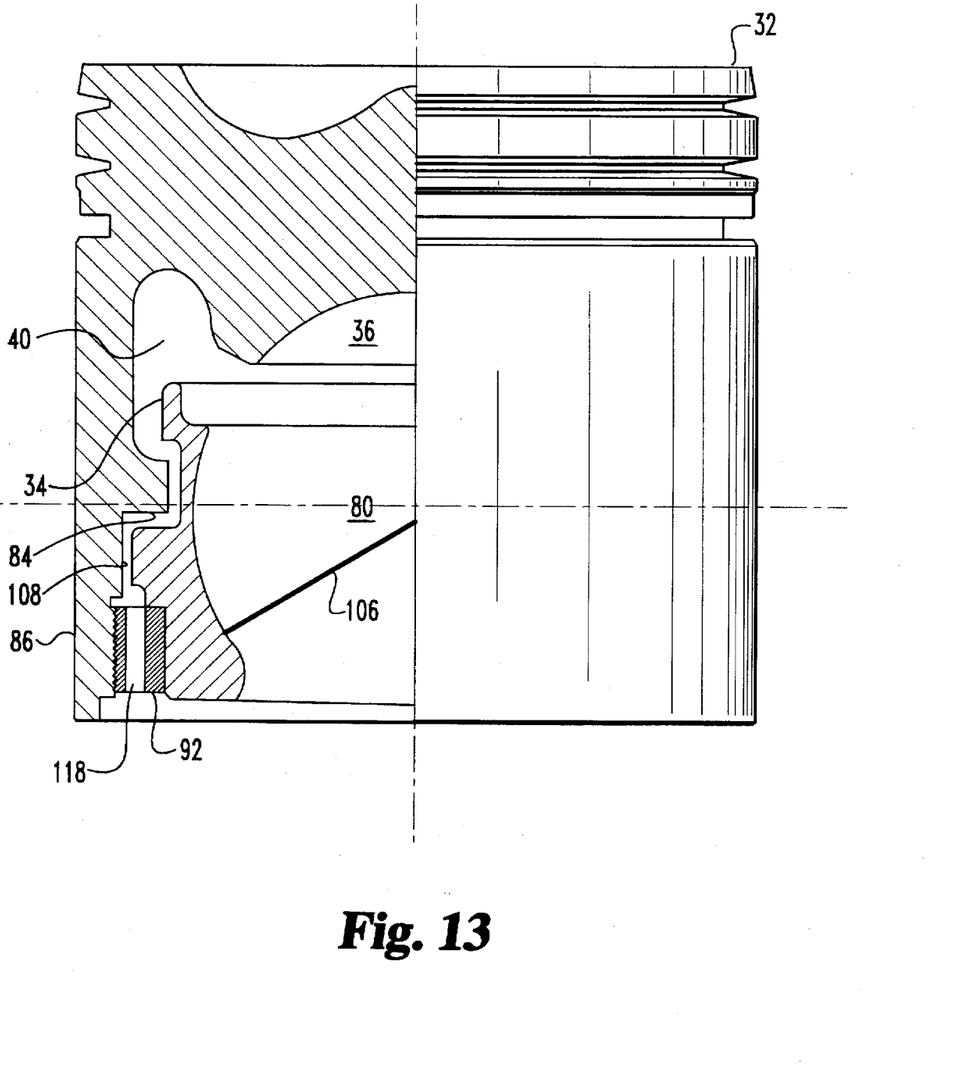
FIG. 13 is a partially cross-sectional side elevational view of the holder ring half of the present invention installed into a spherically jointed piston.

Lubricating oil is introduced between the holder ring socket surface 80 and the connecting rod spherical small end by means of a plurality of grooves 106 preferably equally spaced around the socket surface 80. The grooves 106 are preferably cut into the socket surface 80 at an angle of 30° to the horizontal. The grooves 106 allow oil into the socket 80 but do not operate to drain oil from the socket 80. The cooling gallery 40 of the spherical joint piston 32 operates properly when it is more than half full of lubricating/cooling oil. The level of the cooling oil within the piston cooling gallery 40 is maintained by means of the oil dam 54 and one or more drainage grooves 108 equally spaced around the outer perimeter of the holder rings 34. The drainage grooves 108 direct the cooling oil from the cooling gallery 40, through the upper holder ring shoulder 110, between the holder ring and the piston skirt 112 and into annular groove 114 in the lower holder ring shoulder 116. The cooling oil then drains from the annular groove 114 through one or more drain holes 118 equally spaced in the screw-threaded collar 92 and substantially aligned with the annular groove 114.

The number and size of the oil drainage grooves 108 are coordinated with the rate at which oil is supplied to the piston cooling gallery 40 in order to reach an equilibrium level of oil within the piston cooling gallery 40. Those skilled in the art will recognize that the spherical joint connecting rods and holder rings of the present invention exhibit significant advantages over prior art devices in several areas of their design, construction and function.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A spherical joint connecting rod, comprising:
   a big end adapted to slidingly engage an engine crankshaft;
   a semi-spherical small end adapted to be received within a spherically jointed piston; and
   a shank coupling the big end to the small end, the shank having a substantially elliptical cross-section at at least one point along its length.

2. The spherical joint connecting rod of claim 1, wherein the shank has a substantially square cross-section at an intersection with the big end.

3. The spherical joint connecting rod of claim 1, wherein the shank has a substantially circular cross-section at an intersection with the small end.

4. The spherical joint connecting rod of claim 1, further comprising:
   a passageway formed in the shank from the big end to the small end;
   wherein the passageway is operative to supply a lubricant from a first region surrounding the big end to a second region surrounding the small end.

5. The spherical joint connecting rod of claim 4, wherein the passageway includes a plurality of branches within the small end.

6. The spherical joint connecting rod of claim 5, wherein the plurality of branches comprise:
   a central branch operative to supply a lubricant to a piston saddle in contact with the small end;
   at least one lateral branch operative to supply a lubricant to a piston cooling gallery in contact with the small end, said supply of lubricant to the piston cooling gallery being unimpeded throughout an entire range of connecting rod rocking motion.

7. The spherical joint connecting rod of claim 4, wherein the first region is a crankcase surrounding the engine crankshaft.

8. The spherical joint connecting rod of claim 4, wherein the second region is a cooling gallery within the spherically jointed piston.

9. The spherical joint connecting rod of claim 4, further comprising:
   a slotted connection rod bearing disposed at an intersection between the passageway and the big end;
   wherein the slotted connection rod bearing includes a slot therein partially aligned with an opening of the passageway.

10. The spherical joint connecting rod of claim 1, further comprising:
    at least one notch formed in a surface of the small end;
    wherein the notch is configured to receive a spray of lubricant and deflect the lubricant to a region surrounding the small end.

11. The spherical joint connecting rod of claim 10, wherein the notch extends into a transition area between the small end and the shank.

12. The spherical joint connecting rod of claim 10, wherein the region is a cooling gallery within the spherically jointed piston.

13. A spherical joint connecting rod, comprising:

a big end adapted to slidingly engage an engine crankshaft;

a semi-spherical small end adapted to be received within a spherically jointed piston;

a shank coupling the big end to the small end; and at least one notch formed in a surface of the small end;

wherein the notch is configured to receive a spray of lubricant and deflect the lubricant to a first region surrounding the small end.

14. The spherical joint connecting rod of claim 13, wherein the notch extends into a transition area between the small end and the shank.

15. The spherical joint connecting rod of claim 13, wherein the first region is a cooling gallery within the spherically jointed piston.

16. The spherical joint connecting rod of claim 13, wherein the shank has a substantially elliptical cross-section at at least one point along its length.

17. The spherical joint connecting rod of claim 16, wherein the shank has a substantially square cross-section at an intersection with the big end.

18. The spherical joint connecting rod of claim 16, wherein the shank has a substantially circular cross-section at an intersection with the small end.

19. The spherical joint connecting rod of claim 13, further comprising:

a passageway formed in the connecting rod from the big end to the small end;

wherein the passageway is operative to supply a lubricant from a second region surrounding the big end to the first region surrounding the small end.

20. The spherical joint connecting rod of claim 19, wherein the passageway includes a plurality of branches within the small end.

21. The spherical joint connecting rod of claim 19, wherein the second region is a crankcase surrounding the engine crankshaft.

22. The spherical joint connecting rod of claim 19, further comprising:

a slotted connecting rod bearing disposed at an intersection between the passageway and the big end;

wherein the slotted connecting rod bearing includes a slot therein partially aligned with an opening of the passageway.

* * * * *

UNITED STATES PATENT AND TRADEMARK OFFICE
CERTIFICATE OF CORRECTION

PATENT NO. : 5,685,267
DATED : November 11, 1997
INVENTOR(S) : Paul David Wiczynski et al.

It is certified that error appears in the above-identified patent and that said Letters Patent is hereby corrected as shown below:

In column 2, line 63, please change "tile" to --the--.
In column 3, line 2, please change "tile" to --the--.
In column 3, line 48, please change "tile" to --the--.
In column 3, line 59, please change "pistol." to --piston--.
In column 3, line 60, please change "ting" to --ring--.
In column 4, line 1, please change "tile" to --the--.
In column 4, line 28, please change "Tile" to --The--.
In column 4, line 33, please change "tile" to --the--.
In column 5, line 11, please change "tile" to --the--.
In column 6, line 57, please change "beating" to --bearing--.

Signed and Sealed this

Twenty-eighth Day of December, 1999

Q. TODD DICKINSON

*Attest:*

*Attesting Officer*  *Acting Commissioner of Patents and Trademarks*